(12) United States Patent
Hyun et al.

(10) Patent No.: US 11,200,432 B2
(45) Date of Patent: Dec. 14, 2021

(54) METHOD AND APPARATUS FOR DETERMINING DRIVING INFORMATION

(71) Applicant: SAMSUNG ELECTRONICS CO., LTD., Suwon-si (KR)

(72) Inventors: Yoon-Suk Hyun, Suwon-si (KR); Cheol-Hun Jang, Pohang-si (KR); Ja-hoo Koo, Seoul (KR); Dae-Hyun Ji, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 185 days.

(21) Appl. No.: 16/508,931

(22) Filed: Jul. 11, 2019

(65) Prior Publication Data

US 2020/0125860 A1 Apr. 23, 2020

(30) Foreign Application Priority Data

Oct. 23, 2018 (KR) ........................ 10-2018-0126549

(51) Int. Cl.
*G06K 9/00* (2006.01)
*G06T 7/11* (2017.01)
*G06T 7/13* (2017.01)

(52) U.S. Cl.
CPC ............ *G06K 9/00798* (2013.01); *G06T 7/11* (2017.01); *G06T 7/13* (2017.01); *G06T 2207/20081* (2013.01); *G06T 2207/30256* (2013.01)

(58) Field of Classification Search
CPC .. G06K 9/00798; G06K 9/00791; G06T 7/11; G06T 7/13; G06T 2207/20081;
(Continued)

(56) References Cited

U.S. PATENT DOCUMENTS 8,055,445 B2 11/2011 Schiffmann et al.
8,750,567 B2 6/2014 Zhang et al.
(Continued)

FOREIGN PATENT DOCUMENTS

JP 2012-198730 A 10/2012
KR 10-2010-0097907 A 9/2010
(Continued)

OTHER PUBLICATIONS

Wei Liu et al., "Vision-Based Real-Time Lane Marking Detection and Tracking", Intelligent Transportation Systems, 2008, ITSC 2008, 11th International IEEE, Conference On, IEEE, Piscataway, NJ, XP031383338, Oct. 12, 2008, pp. 49-54.
(Continued)

*Primary Examiner* — Aaron W Carter
(74) *Attorney, Agent, or Firm* — Sughrue Mion, PLLC

(57) ABSTRACT

Provided are a method and apparatus for determining driving information. The apparatus generates a probability map corresponding to a target object to be detected from a driving image, extracts representative points from a candidate region of the target object detected from the driving image, extracts some of the representative points based on the probability map, calculates a confidence value for the candidate region of the target object based on the extracted some representative points, and determines driving information of the vehicle based on the confidence value.

14 Claims, 12 Drawing Sheets

(58) Field of Classification Search
CPC ........ G06T 2207/30256; B60W 40/00; B60W 50/14; B60W 2050/146
See application file for complete search history.

(56) References Cited

U.S. PATENT DOCUMENTS

| | | | |
|---|---|---|---|
| 8,781,644 B2 | 7/2014 | Samukawa et al. | |
| 8,948,954 B1 | 2/2015 | Ferguson et al. | |
| 9,081,385 B1 | 7/2015 | Ferguson et al. | |
| 9,273,971 B2 | 3/2016 | Noh | |
| 2012/0215377 A1* | 8/2012 | Takemura | B60W 30/12 701/1 |
| 2017/0101097 A1* | 4/2017 | Buchner | B60W 30/16 |
| 2018/0022351 A1* | 1/2018 | Habu | B60W 40/04 701/96 |
| 2018/0031384 A1 | 2/2018 | Lee et al. | |
| 2018/0061226 A1* | 3/2018 | Thelen | G01C 21/32 |
| 2018/0173970 A1 | 6/2018 | Bayer et al. | |
| 2018/0181817 A1* | 6/2018 | Yan | G06K 9/6273 |
| 2018/0247138 A1* | 8/2018 | Kang | B60W 50/14 |
| 2019/0130182 A1* | 5/2019 | Zang | G06K 9/00651 |
| 2020/0026930 A1* | 1/2020 | Gu | G06K 9/4604 |
| 2020/0064855 A1* | 2/2020 | Ji | G05D 1/0246 |
| 2020/0082182 A1* | 3/2020 | Lee | G06K 9/00825 |
| 2020/0104607 A1* | 4/2020 | Kim | G06T 7/70 |
| 2020/0117205 A1* | 4/2020 | Ha | G06N 3/0445 |
| 2020/0117920 A1* | 4/2020 | Lee | G06K 9/4604 |
| 2020/0118283 A1* | 4/2020 | Lee | G06T 7/70 |
| 2020/0125860 A1* | 4/2020 | Hyun | G06K 9/00791 |
| 2020/0125861 A1* | 4/2020 | Sota | B62D 15/025 |
| 2020/0134427 A1* | 4/2020 | Oh | G06K 9/6264 |
| 2020/0143557 A1* | 5/2020 | Choi | G06T 7/70 |
| 2020/0160547 A1* | 5/2020 | Liu | G06K 9/6211 |
| 2020/0180694 A1* | 6/2020 | Suzuki | B62D 6/00 |
| 2020/0293797 A1* | 9/2020 | Liu | G06K 9/00664 |
| 2020/0393265 A1* | 12/2020 | Piao | G06T 7/10 |

FOREIGN PATENT DOCUMENTS

| | | |
|---|---|---|
| KR | 10-2014-0139802 A | 12/2014 |
| KR | 10-2017-0085752 A | 7/2017 |
| KR | 10-1787292 B1 | 10/2017 |
| KR | 10-2018-0009755 A | 1/2018 |
| WO | 2011/160672 A1 | 12/2011 |

OTHER PUBLICATIONS

Xin Liu et al., Vision-based long-distance lane perception and front vehicle location for full autonomous vehicles on highway roads, Journal of Central South University of Technology, Science & Technology of Mining and Metallurgy, Central South University, vol. 19, No. 5, Heidelberg, DE, XP035048188, Apr. 27, 2012, pp. 1454-1465.
Communication dated Feb. 24, 2020, issued by the European Patent Office in counterpart European Application No. 19198390.7.

* cited by examiner

|        | Pt 1 | Pt 2 | Pt 3 | Pt 4 | Pt 5 | Pt 6 | ... | Pt 99 | Pt 100 |
|--------|------|------|------|------|------|------|-----|-------|--------|
| Line 1 | 0.99 | 0.98 | 0.98 | 0.92 | 0.05 | 0.07 | ... | 0.92  | 0.93   |
| Line 2 | 1.00 | 1.00 | 0.21 | 0.01 | 0.04 | 0.05 | ... | 0.96  | 0.04   |
| Line 3 | 0.01 | 1.00 | 0.21 | 0.05 | 0.06 | 0.07 | ... | 0.01  | 0.00   |
| Line 4 | 0.02 | 0.14 | 1.00 | 0.95 | 0.13 | 0.08 | ... | 0.02  | 0.12   |

<EXTRACT PROBABILITY VALUE FOR WAYPOINT>

730

|        | Pt 1 | Pt 2 | Pt 3 | Pt 4 | Pt 5 | Pt 6 | ... | Pt 99 | Pt 100 | Avg  |
|--------|------|------|------|------|------|------|-----|-------|--------|------|
| Line 1 | 0.99 | 0.98 | 0.98 | 0.92 | 0.05 | 0.07 | ... | 0.92 | 0.93 | 0.97 |
| Line 2 | 1.00 | 1.00 | 0.21 | 0.01 | 0.04 | 0.05 | ... | 0.96 | 0.04 | 0.66 |
| Line 3 | 0.01 | 1.00 | 0.21 | 0.05 | 0.06 | 0.07 | ... | 0.01 | 0.00 | 0.15 |
| Line 4 | 0.02 | 0.14 | 1.00 | 0.95 | 0.13 | 0.08 | ... | 0.02 | 0.12 | 0.18 |

<CALCULATE AVERAGE VALUE FOR TOP VALUES (e.g., 25 %)
AMONG WAYPOINT VALUES>

METHOD AND APPARATUS FOR DETERMINING DRIVING INFORMATION

CROSS-REFERENCE TO RELATED APPLICATION

This application claims the benefit of Korean Patent Application No. 10-2018-0126549, filed on Oct. 23, 2018, in the Korean Intellectual Property Office, the disclosure of which is incorporated herein in its entirety by reference.

BACKGROUND

The inventive concept relates to a method and apparatus for determining driving information.

When the control of the movement of a vehicle is divided into longitudinal and lateral, the lateral control, e.g., control toward the left or right of a moving vehicle or side-to-side control, often depends entirely on lane lines. Even when a method of recognizing lane lines is considerably accurate, since there may be an error therein, there may be a serious danger in road driving. Thus, not only the result of lane line recognition but also the confidence of recognition should be accurately informed to reduce the risk of an accident that may be caused by the movement of a vehicle based on incorrect information.

SUMMARY

The inventive concept provides a method and apparatus for determining driving information.

According to an aspect of the inventive concept, there is a method of determining driving information for a vehicle, the method including: generating a probability map corresponding to a target object to be detected from a driving image, the probability map being generated based on determining a probability value for a unit of at least one pixel; extracting representative regions from a candidate region of the target object detected from the driving image; extracting at least two of the representative regions based on the probability map; calculating a confidence value for the candidate region of the target object based on the extracted at least two of representative regions; and determining driving information of the vehicle based on the confidence value.

According to another aspect of the inventive concept, there is method of determining driving information, the method including: generating a probability map corresponding to a lane line to be detected from a driving image, the generating of the probability map being based on pixel-by-pixel segmentation, the probability map being generated based on determining a probability value for a unit of at least one pixel; detecting a lane line region based on line fitting and on the probability map; extracting representative regions from the lane line region; extracting at least two of the representative regions corresponding to top probability values of a predetermined percentage among the representative regions, the extracting being based on the probability map; calculating a confidence value for the lane line region based on the extracted at least two of the representative regions; and determining driving information of the vehicle based on the confidence value.

According to yet another aspect of the inventive concept, there is an apparatus for determining driving information, the apparatus including: a sensor configured to obtain a driving image; a processor configured to: generate a probability map corresponding to a target object to be detected from the driving image, extract representative regions from a candidate region of the target object detected from the driving image, extract at least two of the representative regions based on the probability map, calculating a confidence value for the candidate region of the target object based on the extracted at least two representative regions, and determine driving information of the vehicle based on the confidence value; and a communication interface configured to output the driving information.

According to an aspect of the inventive concept, there is provided a method of determining driving information, the method including: generating a probability map corresponding to a target object to be detected from a driving image of a vehicle; extracting representative regions from a candidate region of the target object detected from the driving image; extracting some of the representative regions based on the probability map; calculating a confidence value for the candidate region of the target object based on the extracted some representative regions; and determining driving information of the vehicle based on the confidence value.

According to another aspect of the inventive concept, there is provided a method of determining driving information, the method including: generating a probability map corresponding to a lane line to be detected from a driving image of a vehicle based on pixel-by-pixel segmentation; detecting a lane line region through line fitting based on the probability map; extracting representative regions from the lane line region; extracting some representative regions corresponding to upper probability values of a predetermined ratio among the representative regions based on the probability map; calculating a confidence value for the lane line region based on the extracted some representative regions; and determining driving information of the vehicle based on the confidence value.

According to another aspect of the inventive concept, there is provided an apparatus for determining driving information, the apparatus including: a sensor sensing a driving image of a vehicle; a processor generating a probability map corresponding to a target object to be detected from the driving image, extracting representative regions from a candidate region of the target object detected from the driving image, extracting some of the representative regions based on the probability map, calculating a confidence value for the candidate region of the target object based on the extracted some representative regions, and determining driving information of the vehicle based on the confidence value; and a communication interface outputting the driving information.

BRIEF DESCRIPTION OF THE DRAWINGS

Embodiments of the inventive concept will be more clearly understood from the following detailed description taken in conjunction with the accompanying drawings in which:

FIG. 7 is a diagram illustrating a method of calculating a confidence value by extracting some of representative points, according to an embodiment;

DETAILED DESCRIPTION OF THE EMBODIMENTS

Figure 1:
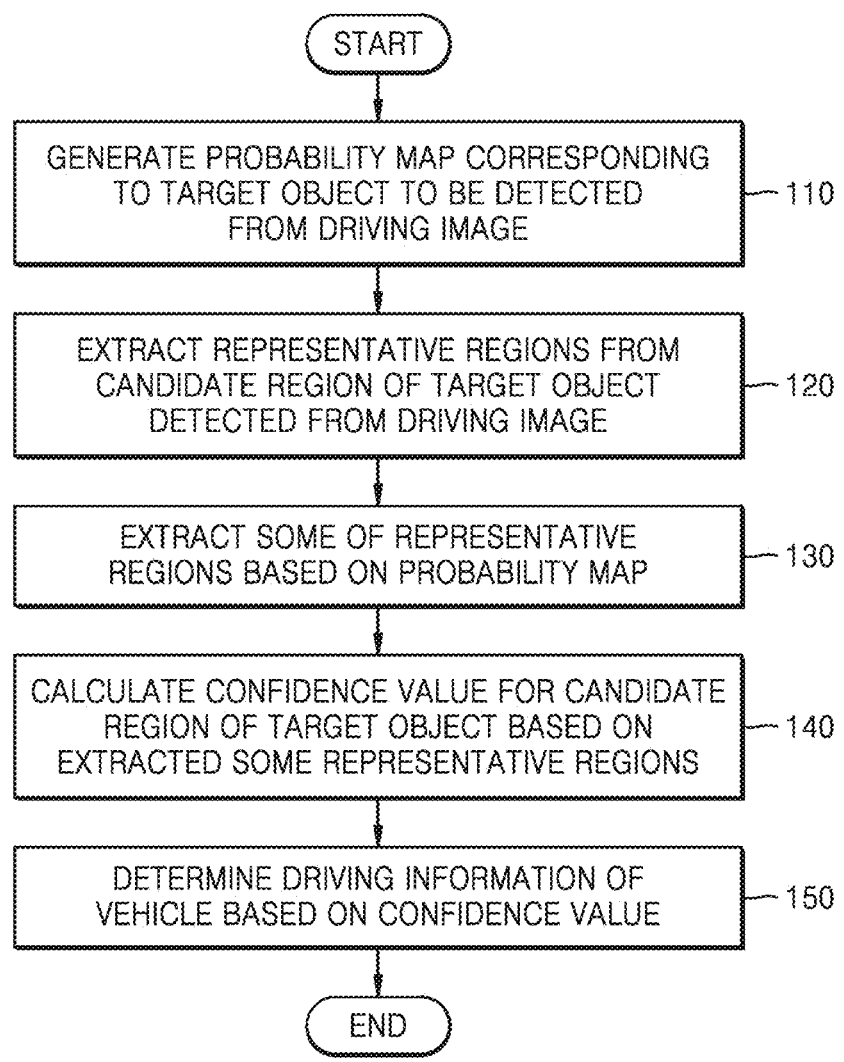
FIG. 1 is a flowchart illustrating a method of determining driving information, according to an embodiment.

FIG. 1 is a flowchart illustrating a method of determining driving information, according to an embodiment. Referring to FIG. 1, an apparatus for determining driving information according to an embodiment (hereinafter, referred to as "determination apparatus") may generate a probability map corresponding to a target object to be detected from a driving image of a vehicle, i.e., a driving image (operation 110). The determination apparatus may capture a driving image including the vehicle itself, other vehicles, pedestrians, traffic lights, signs, lane lines, and/or the like by using various photographing or image capture devices installed in, on, or disposed about the vehicle.

The driving image may be acquired through a photographing or an image capturing device that is mounted on the vehicle to photograph or capture front views, side views, or other views of the vehicle during the operation of the vehicle. In an embodiment, the driving image includes image of a road in front of the vehicle or in the direction toward which the vehicle is traveling. In an alternative embodiment, the photographing or image capturing device may be disposed inside the vehicle or even disposed outside and unattached to the vehicle. Alternatively, the driving image may be an external image of at least one selected from a front view and a side view of the vehicle received from outside the determination apparatus through a communication interface (see a communication interface 1270 of FIG. 12). In addition to a color image, the driving image may include various images such as an infrared image, a depth image, a stereo image, an ultrasonic image, or an RF image. The driving image may include one frame or may include a plurality of frames. The driving image may be a two-dimensional (2D) image or a three-dimensional (3D) image. All the aforementioned images may be captured while the vehicle is in motion or while the vehicle is not in motion.

The target object may include, for example, lane lines including boundary lines of a driving lane of the vehicle. Hereinafter, the "vehicle" may be understood as a subject vehicle including an autonomous or automatic driving function and/or an advanced driver assistance (ADA) function. The determination apparatus may be a vehicle or a user terminal such as a navigation device, a smart phone, and other mobile devices. In other embodiments, the determination apparatus may include an electronic control unit (ECU), including not but not limited to certain modules. The determination apparatus may be part of an ADA system.

According to embodiments, the target object detected by the determination apparatus may include, for example, road markings, parking lines, parking markings, pedestrians, vehicles, traffic lights, signs, animals, plants, buildings, etc., in addition to the lane lines but is not limited to the lane lines. A method of generating the probability map, performed by the determination apparatus, will be described below in detail with reference to FIG. 4.

The determination apparatus may extract representative regions from a candidate region of the target object detected from the driving image (operation 120). The determination apparatus may directly detect the candidate region of the target object from the driving image or may receive the candidate region of the target object pre-detected from the driving image. The determination apparatus may extract a plurality of representative regions from the candidate region of the target object, for example, at equal intervals. In this case, the candidate region of the target object may include a region of the target object to be detected by the determination apparatus and a region other than the target object. A method of determining the candidate region of the target object, performed by the determination apparatus, will be described below with reference to FIG. 5. Also, a process of extracting the representative regions from the candidate region of the target object, performed by the determination apparatus, will be described below in detail with reference to FIG. 6.

The determination apparatus may extract some of the representative regions based on the probability map generated in operation 110 (operation 130). The determination apparatus may determine first probability values respectively corresponding to the representative regions based on the probability map and extract some representative regions corresponding to the first probability values matching a preset reference among all the first probability values (or among a plurality of the first probability values), the first probability values matching the preset reference being second probability values. A process of extracting some representative regions among the representative regions, performed by the determination apparatus, will be described below in detail with reference to FIG. 7.

The determination apparatus may calculate a confidence value for the candidate region of the target object based on some representative regions extracted in operation 130 (operation 140). A method of calculating the confidence value, performed by the determination apparatus, will be described below in detail with reference to FIG. 8.

The determination apparatus may determine driving information of the vehicle based on the confidence value (operation 150). The driving information of the vehicle may include, for example, driving parameters of the vehicle, a driving path of the vehicle, a lane center line (or a middle of the lane) of the vehicle used to determine the driving path of the vehicle, and/or a lateral position of the vehicle. The driving parameters may include, for example, a driving angle control parameter, an acceleration control parameter, a deceleration control parameter, and/or a turn signal lamp control parameter. The driving parameters generated by the determination apparatus may be used to avoid a collision between the vehicle and another vehicle, in addition to centering the vehicle in the driving lane.

In operation 150, the determination apparatus may determine a center line of the driving lane based on, for example, confidence values of the boundary lines of the driving lane. The determination apparatus may adjust the lateral position of the vehicle based on the center line of the driving lane or determine the driving path. A method of determining the driving information of the vehicle, performed by the determination apparatus, will be described below in detail with reference to FIGS. 9 and 10

The determination apparatus according to an embodiment may output the driving information of the vehicle explicitly or implicitly. "Explicitly outputting the driving information of the vehicle" may include, for example, displaying the driving information of the vehicle on a screen (or a map) and/or outputting the driving information of the vehicle in audio form. "Implicitly outputting the driving information of the vehicle" may include, for example, controlling the vehicle by using the driving information of the vehicle, determining the position of the vehicle, and/or setting or changing the path thereof.

Embodiments described below may be used to display lane lines in an augmented reality navigation system in a vehicle such as a smart vehicle, or to generate visual information for assisting steering of an autonomous vehicle. Also, the embodiments may be used to assist safe and comfortable driving by interpreting visual information in a device including an intelligent system such as a head-up display (HUD) installed for full autonomous driving or driving assistance in the vehicle. The embodiments may be applied to, for example, autonomous vehicles, intelligent vehicles, smart phones, and mobile devices. Hereinafter, embodiments will be described in detail with reference to the accompanying drawings. Like reference numerals in the drawings may denote like elements.

Hereinafter, "roads" may include expressways, national roads, local roads, and/or national expressways on which user vehicles are driving. A road may include one or more lane lines. A "driving lane" may correspond to any one of a plurality of lanes which a driving vehicle is using (i.e., is driving on). "Lanes" may be distinguished from each other by lane line markings displayed on the road surface. A lane may be defined by lane lines on the left and right of the lane, that is, by lane boundary lines.

A "representative region" described herein may be construed as including, in addition to the representative region, one or more representative points constituting the representative region. Hereinafter, for convenience of description, a description will be given based on an operation on the representative point; however, this description may also be similarly applied to the representative region as well as to the representative point.

Figure 2:
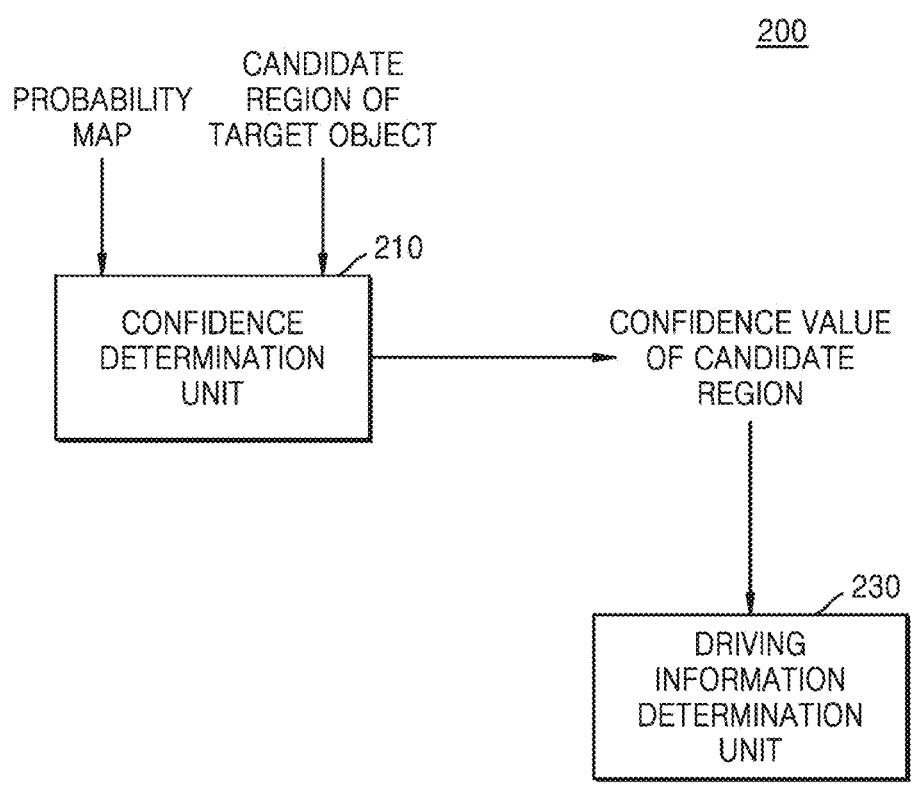
FIG. 2 is a diagram illustrating an operation of an apparatus for determining driving information according to an embodiment.

FIG. 2 is a diagram illustrating an operation of an apparatus for determining driving information according to an embodiment. A determination apparatus 200 according to an embodiment may include a confidence determination unit 210 and a driving information determination unit 230. Hereinafter, for convenience of description, a case where a target object is lane lines will be described as an example; however, the target object is not limited to the lane lines and the same operation may also be performed on various objects such as vehicles, pedestrians, and buildings.

The confidence determination unit 210 may receive a probability map corresponding to a target object to be detected from a driving image by the determination apparatus 200 and a candidate region of the target object. The confidence determination unit 210 may extract some of representative points extracted from the candidate region of the target object based on the probability map. For example, the confidence determination unit 210 may extract 100 representative points from the candidate region of the target object at equal intervals corresponding to up to 50 m. In this case, the size of the candidate region from which representative points are extracted and/or the number of representative points to be extracted may be adjustable. The confidence determination unit 210 may extract a plurality of representative points from an image domain of candidate regions of the target object at equal intervals. Alternatively, the confidence determination unit 210 may convert candidate regions of the target object from an image domain to a world domain and extract a plurality of representative points from the candidate regions in the world domain at equal intervals. In this case, the representative points may be, for example, waypoints corresponding to the lane line.

The confidence determination unit 210 may determine first probability values corresponding to the waypoints corresponding to the lane line based on the probability map. The confidence determination unit 210 may extract some representative points having first probability values matching a preset reference among all the first probability values, the first probability values matching the preset reference being second probability values. The confidence determination unit 210 may calculate a confidence value for the candidate region of the target object based on the extracted some representative points.

For example, the confidence determination unit 210 may find probability values corresponding to the positions of the waypoints corresponding to the lane line in the probability map and determine the found probability values as the first probability values. The confidence determination unit 210 may obtain the average of the first probability values matching the preset reference (e.g., the top 30%) among all the first probability values, the first probability values matching the preset reference being second probability values. The confidence determination unit 210 may set the average of the second probability values as a confidence value of the lane line. In this case, the preset reference may be adjustable.

For example, in a case where the lane line is formed of a dashed line, in some of lane line candidate regions, there may be a portion having a low pixel-by-pixel probability value in a region that is not a dashed lane line. Also, there may be a safety risk when a straight-line and/or curved-line object, which is not the lane line, is finally calculated as the lane line. In an embodiment, when a lane line component appears discontinuously like a dashed line, a higher accuracy may be secured by determining the confidence by using the probability value of the lane line component, but not using a region not corresponding to the lane line component. In other words, the determination apparatus 200 may provide a more accurate confidence value for lane line recognition by calculating a confidence value for the candidate region of the lane line by using only some waypoints having high probability values, instead of reflecting the probability values of all the waypoints.

Upon receiving the confidence value for the candidate region of the target object from the confidence determination unit 210, the driving information determination unit 230 may determine driving information of the vehicle based on the received confidence value.

In an embodiment, more various methods for path determination and/or driving control may be applied by representing the confidence of the lane line in more detailed scores instead of determining the confidence of the lane line simply as True or False.

Figure 3:
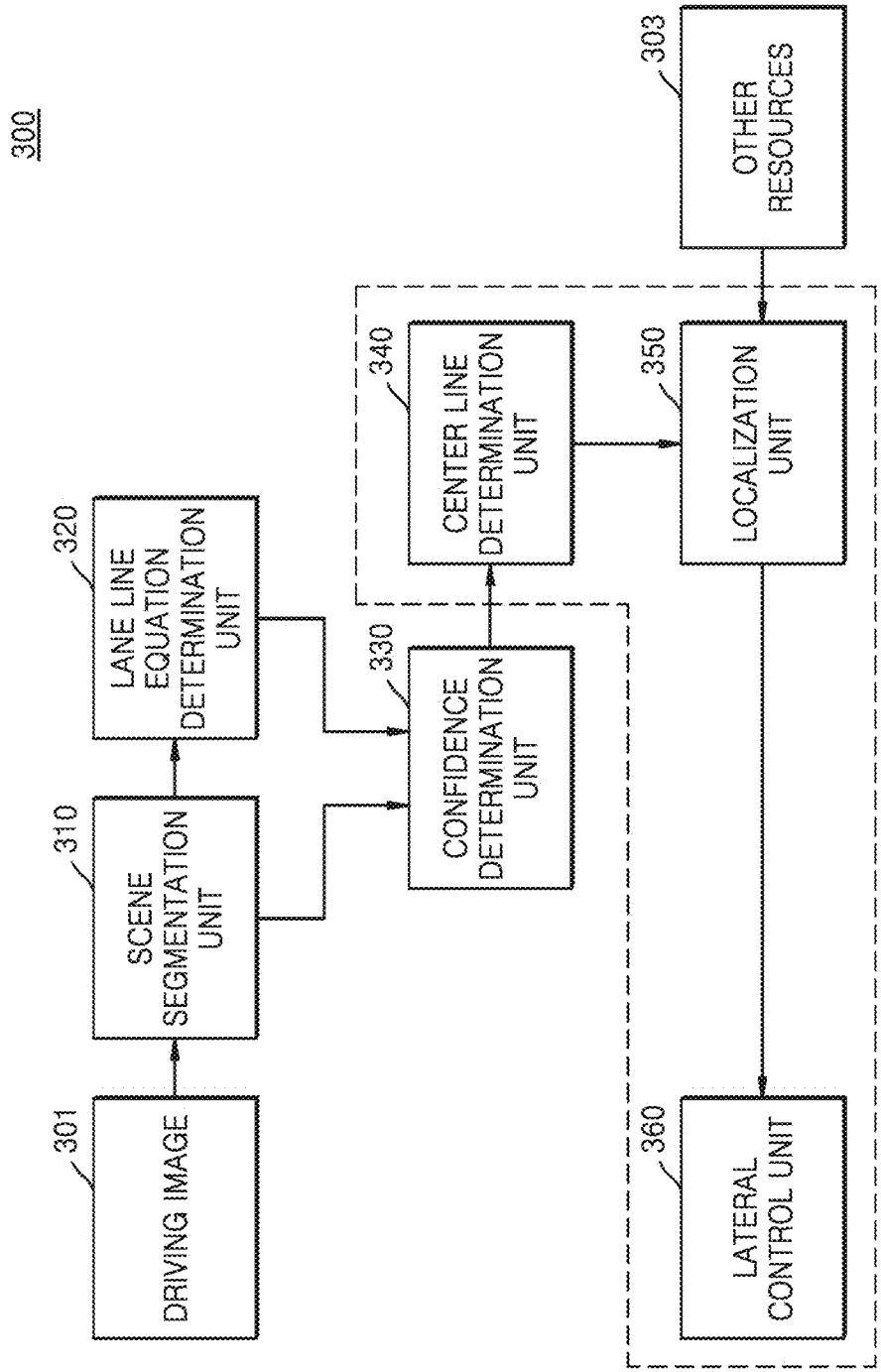
FIG. 3 is a diagram illustrating a configuration of an apparatus for determining driving information according to an embodiment.

FIG. 3 is a diagram illustrating a configuration of an apparatus for determining driving information according to an embodiment. Referring to FIG. 3, a determination apparatus 300 according to an embodiment may include a scene segmentation unit 310, a lane line equation determination unit 320, a confidence determination unit 330, a center line determination unit 340, a localization unit 350, and a lateral control unit 360.

The scene segmentation unit 310 may generate a probability map corresponding to a target object by calculating a pixel-by-pixel probability based on a driving image 301. In this case, the pixel-by-pixel probability may include a probability that a corresponding pixel corresponds to the target object, i.e., the probability is determined for a unit of pixel. For example, when the target object is lane lines including boundary lines of a driving lane, the scene segmentation unit 310 may provide (or transmit) a probability map corresponding to a lane line (class) to the lane line equation determination unit 320 and the confidence determination unit 330. In another embodiment, the probability map may be based on a unit of multiple pixels, e.g., a single probability is determined for a unit of two pixels, for a unit of three pixels, or for a unit of four pixels, etc.

Upon receiving the probability map corresponding to the lane line (class), the lane line equation determination unit 320 may determine a lane line equation through line fitting based on the segmentation result. The lane line equation determination unit 320 may detect lane lines (or lane line regions) by using the lane line equation. The lane line equation determination unit 320 may transmit the detected lane lines (lane line regions) to the confidence determination unit 330.

The confidence determination unit 330 may determine confidence values of the lane lines based on the probability map corresponding to the lane line (class) received from the scene segmentation unit 310 and the lane lines (lane line regions) received from the lane line equation determination unit 320. The confidence determination unit 330 may extract representative points (e.g., waypoints) from the lane lines based on the probability map corresponding to the lane line (class) and extract some representative points corresponding to top probability values of a predetermined percentage among the extracted representative points. The confidence determination unit 330 may calculate confidence values for the lane lines based on the extracted some representative points. The operation of the confidence determination unit 330 is the same as the operation of the confidence determination unit 210 described above with reference to FIG. 2, and thus redundant descriptions thereof will be omitted for conciseness.

The confidence determination unit 330 may transmit the confidence values of the lane lines to the center line determination unit 340.

The center line determination unit 340 may determine a center line of a driving lane based on the confidence values of the lane lines.

Based on the center line of the driving lane received from the center line determination unit 340, the localization unit 350 may adjust the position of the vehicle such that the vehicle may drive along the center line of the driving lane. According to embodiments, when the center line of the driving lane is not determined, the localization unit 350 may adjust the position of the vehicle by using other resources 303 such as other sensors.

The lateral control unit 360 may perform lateral control of the vehicle by using information received from the localization unit 350. For example, the lateral control unit 360 may adjust the steering angle of a steering wheel of the vehicle based on the driving parameters. The center line determination unit 340, the localization unit 350, and the lateral control unit 360 may constitute the driving information determination unit 230 described above with reference to FIG. 2.

Figure 4:
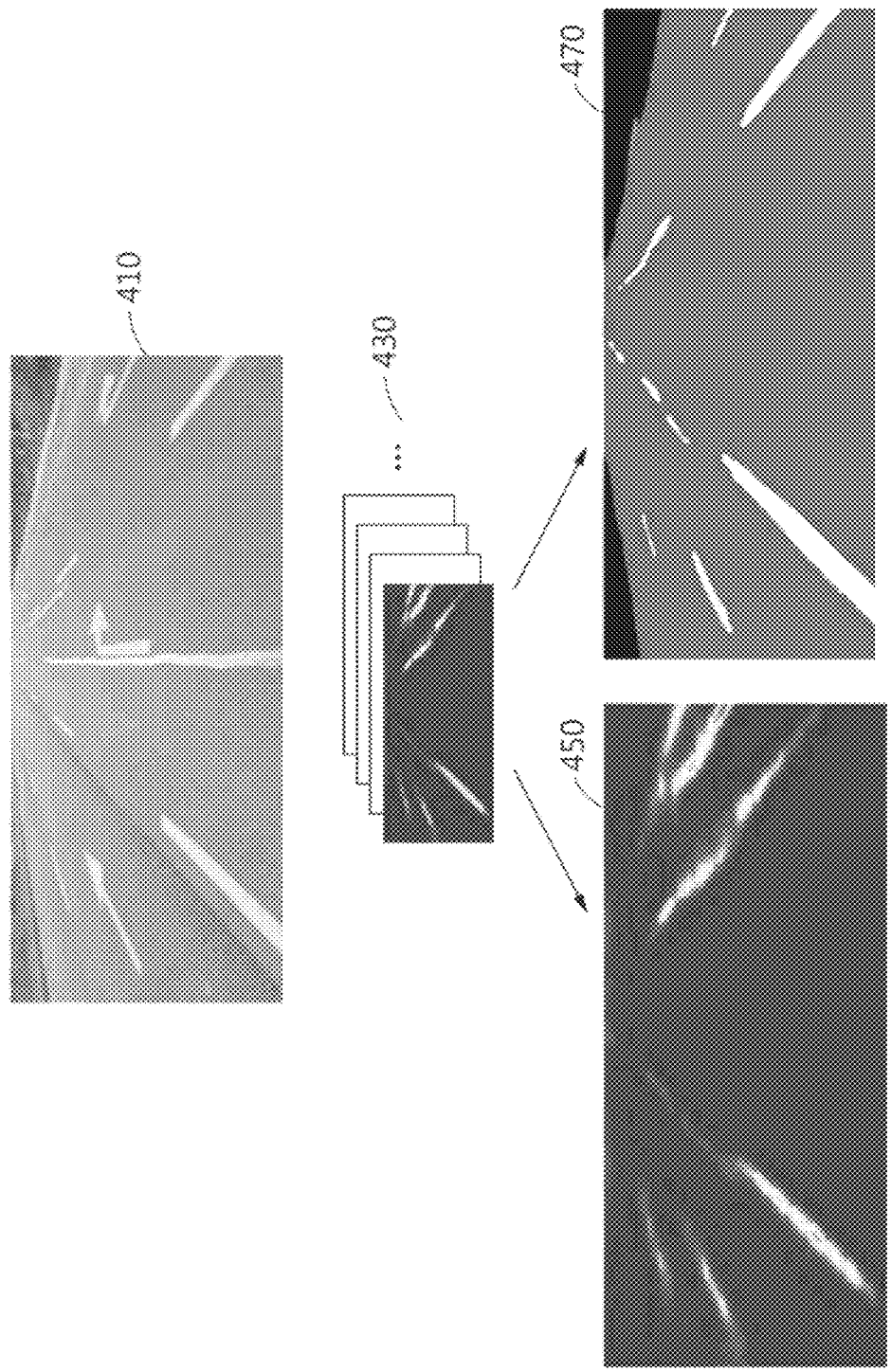
FIG. 4 is a diagram illustrating a process of generating a probability map, according to an embodiment.

FIG. 4 is a diagram illustrating a process of generating a probability map, according to an embodiment. Referring to FIG. 4, a driving image 410, a class-by-class probability map 430 of the driving image, a probability map 450 of the lane line, and a segmentation result 470 are illustrated. The process of FIG. 4 may be performed, for example, by the scene segmentation unit 310 described above.

The determination apparatus according to an embodiment may determine a pixel-by-pixel class of the driving image by using various scene segmentation algorithms and calculate a pixel-by-pixel probability corresponding to each class based on the pixel-by-pixel class, to generate the class-by-class probability map 430. The determination apparatus may acquire the final segmentation result 470 by applying an argmax function to the class-by-class probability map 430. In this case, the class-by-class probability map 430 may include, for example, a probability map of the vehicle class, a probability map of the pedestrian class, and/or a probability map of the sidewalk class in addition to the probability map 450 of the lane line class. For example, in the probability map 450 of the lane line class, a region having a high probability of being the lane line may appear bright, and a region having a low probability of being the lane line may appear dark.

In an embodiment, the probability map of the lane line class may be acquired even without an additional processing load by using the probability map of the lane line class among the class-by-class probability maps generated in the process of performing scene segmentation.

Figure 5:
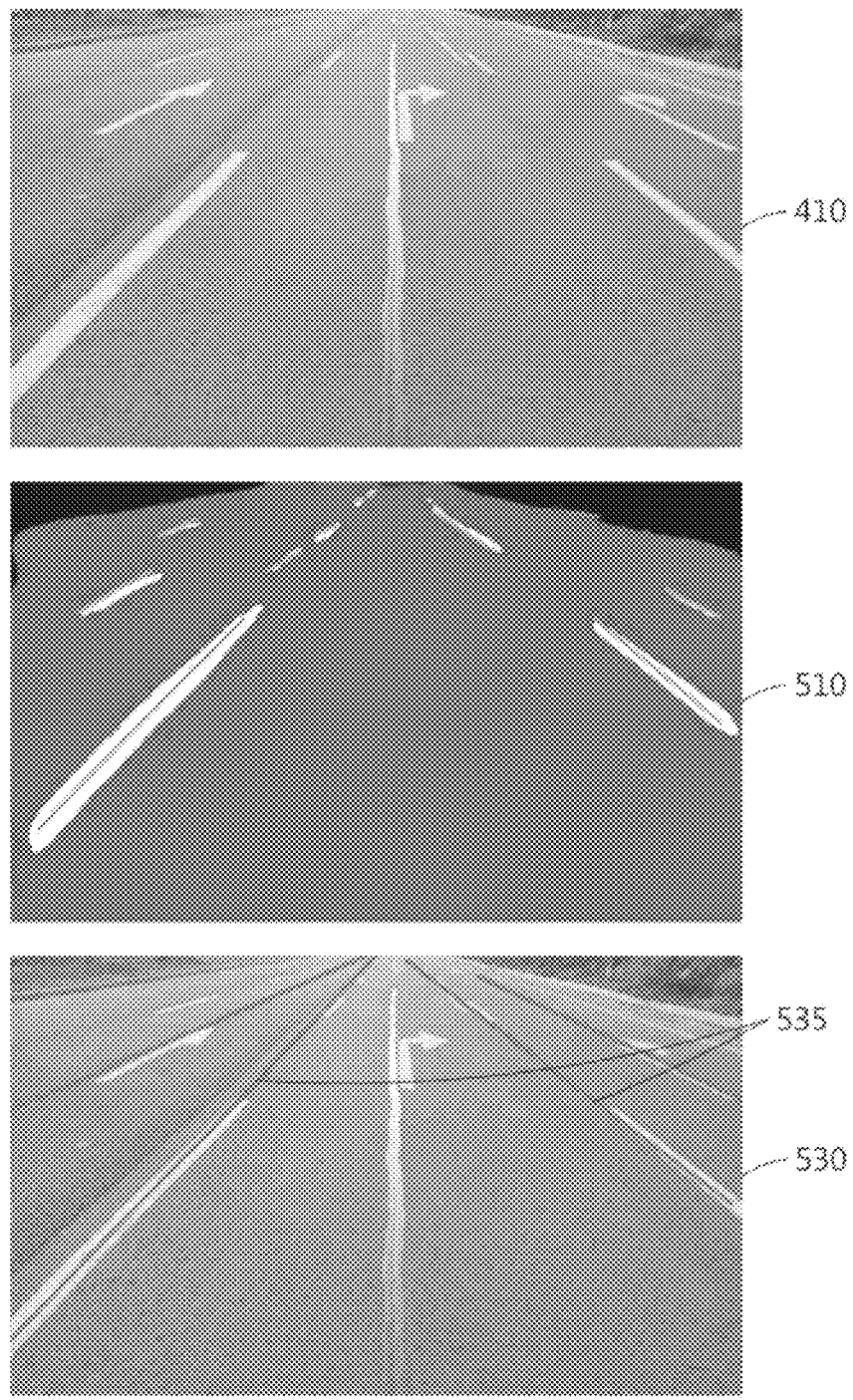
FIG. 5 is a diagram illustrating a method of determining a candidate region of a target object, according to an embodiment.

FIG. 5 is a diagram illustrating a method of determining or detecting a candidate region of a target object, according to an embodiment. Referring to FIG. 5, a driving image 410, a diagram 510 showing a feature extraction result, and a diagram 530 showing a line fitting result are illustrated. The process of FIG. 5 may be performed, for example, by the lane line equation determination unit 320 described above.

The determination apparatus may extract a feature corresponding to the lane line from the driving image 410. For example, the determination apparatus may acquire the feature extraction result corresponding to the lane line as shown in the diagram 510 by determining the probability values corresponding to the lane line by the scene segmentation described above. According to embodiments, the determination apparatus may acquire the feature extraction result corresponding to the lane line as shown in the diagram 510 by determining the feature points corresponding to the lane line by an edge detection method. Alternatively, for example, the determination apparatus may detect a lane line from a driving image by using a convolution neural network (CNN) that is pre-trained to recognize a target object such as a lane line. For example, the CNN may be pre-trained to learn a bounding box of lane line markings and non-lane line markings to be detected in the driving image, and the types of lane line markings and non-lane line markings to be detected.

The determination apparatus may determine a lane line equation through line fitting based on the segmentation result. The determination apparatus may detect or determine candidate regions of the lane lines by using the lane line equation. The result of fitting candidate regions 535 of the lane lines, which have been detected by the determination apparatus by using the lane line equation, to the driving image 410 may be as shown in the diagram 530.

Figure 6:
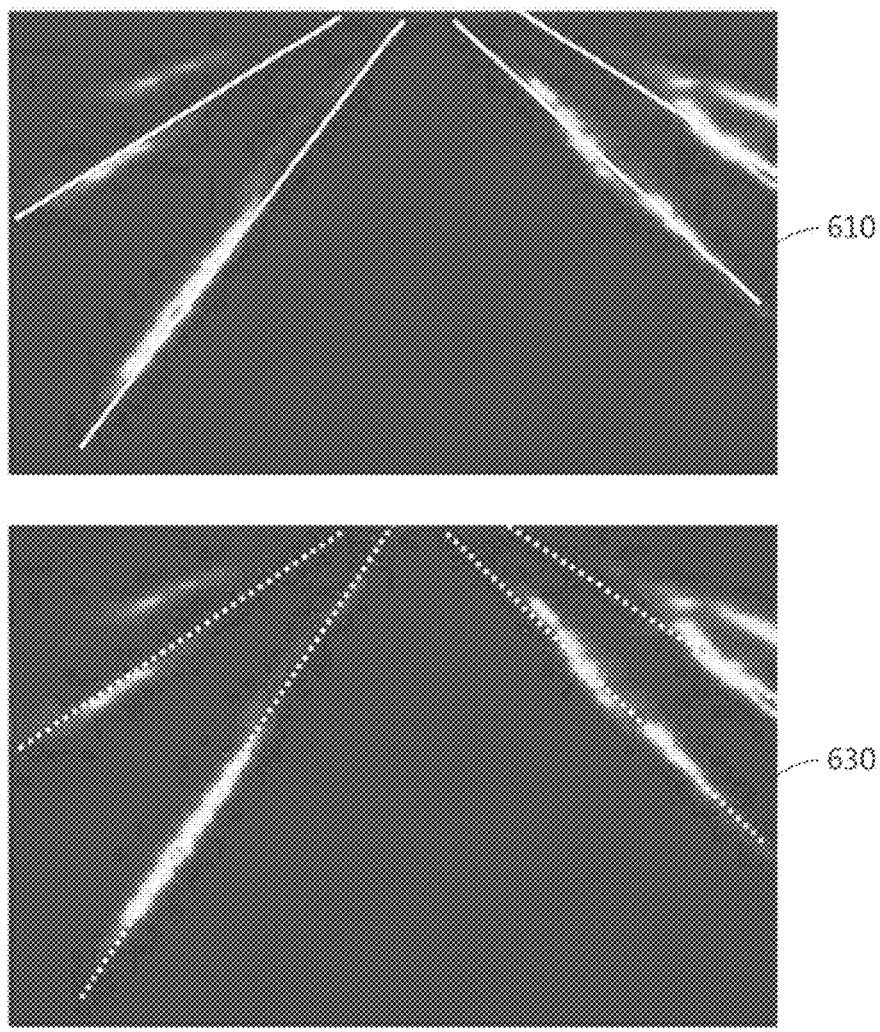
FIG. 6 is a diagram illustrating a process of extracting representative points from a candidate region of a target object, according to an embodiment.

FIG. 6 is a diagram illustrating a process of extracting representative points from a candidate region of a target object, according to an embodiment. Referring to FIG. 6, a diagram 610 represents the candidate region of the lane lines determined by the lane line equation described above in the probability map 450 of the lane line class, and a diagram 630 shows the representative points extracted from the candidate region of the lane lines. The process of FIG. 6 may be performed, for example, by the confidence determination unit 330 described above. The process of FIG. 6 may correspond to a process of extracting a plurality of representative points (or a plurality of representative regions) from the probability map of the lane line, performed by the determination apparatus.

The determination apparatus according to an embodiment may extract a plurality of representative points or waypoints from a candidate region of a target object at equal intervals. The determination apparatus may extract representative points from a candidate region of the target object in an image domain. Alternatively, the determination apparatus may convert candidate regions of the target object from an image domain to a world domain and extract a plurality of representative points from the candidate regions in the world domain at equal intervals.

For example, the determination apparatus may extract a plurality of representative points as shown in the diagram 630 at equal intervals by the number (e.g., 100) of preset representative points within a predetermined distance range (e.g., about 20 m to about 60 m forward) corresponding to a region of interest (ROI) among the candidate regions of the lane lines of the diagram 610. The determination apparatus may extract the representative points by considering both the preset distance range and the number of preset representative points, or may extract the representative points by separately considering the preset distance range and the number of preset representative points. For example, the determination apparatus may adjust the preset distance range and/or the number of preset representative points by considering the resolution (i.e., image quality) of the driving image, the size of the driving image, and/or the weather at the time of capturing the driving image.

FIG. 7 is a diagram illustrating a method of calculating a confidence value by extracting some of representative points, according to an embodiment. Referring to FIG. 7, a table 710 shows first probability values corresponding to representative points, and a table 730 shows the result of calculating statistical values of second probability values of some representative points matching a preset reference among all the representative points. The process of FIG. 7 may be performed, for example, by the confidence determination unit 330 described above. The process of FIG. 7 may correspond to a process of calculating the confidence of the lane line by the average of the top probability values of a plurality of representative points (or a plurality of representative regions) of the lane line, performed by the determination apparatus.

The determination apparatus according to an embodiment may determine first probability values corresponding to representative points based on a probability map. The determination apparatus may determine the first probability values corresponding to the representative points by searching for the probability values corresponding to the positions of the representative points in the probability map. For example, it is assumed that a driving image includes a total of four lane lines including a first lane line Line1, a second lane line Line2, a third lane line Line3, and a fourth lane line Line4 and 100 representative points are extracted for each lane line. In this case, the first probability values corresponding to the representative points of each lane line may be as shown in the table 710.

The determination apparatus may extract some representative points having the first probability values matching the preset reference (e.g., the preset reference may be the second probability values being in the top 25%) among all the first probability values shown in the table 710, the first probability values matching the preset reference being second probability values, as shown in the table 730. The numbers represented in bold in the table 730 may correspond to the first probability values matching the preset reference among all the first probability values, the first probability values matching the preset reference being second probability values.

For example, it is assumed that the probability value "0.99" of the first representative point Pt1, the probability value "0.98" of the second representative point Pt2, the probability value "0.98" of the third representative point Pt3, and the probability value "0.93" of the 100th representative point Pt100 correspond to the probability values that are in the top 25% of all the probability values in the first lane line Line1. The determination apparatus may calculate the statistical values (e.g., average values) of the four second probability values corresponding to the top 25% of all the probability values in the first lane line Line1 as (0.99+0.98+0.98+0.93)/4=0.97. The calculated statistical values of the second probability values may be represented in an average item Avg of the table 730. The determination apparatus may determine the statistical value "0.97" of the second probability values of the first lane line Line1 as the confidence value of the first lane line Line1.

In an embodiment, the preset reference may correspond to a reference for extracting some representative points used to determine the confidence value and may correspond to a top threshold percentage among the first probability values. A method of determining the preset reference will be described below in detail with reference to FIG. 8.

Figure 8:
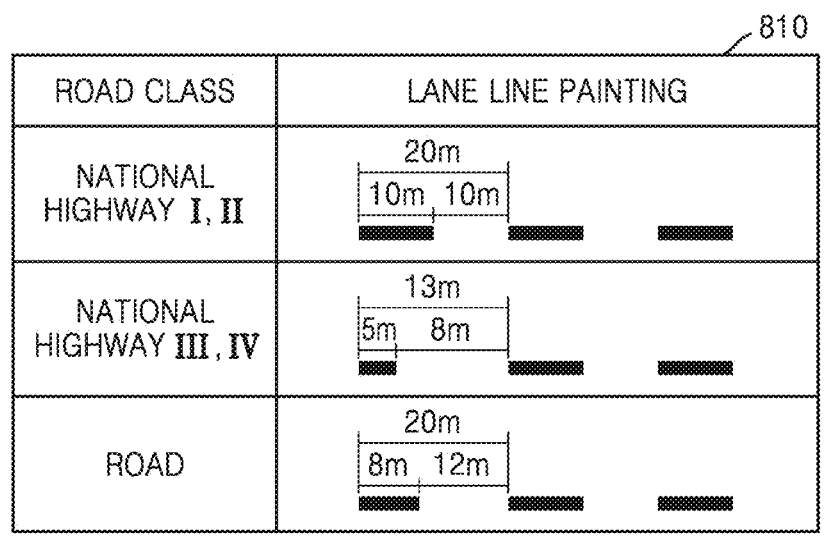
FIG. 8 is a diagram illustrating a method of determining a preset reference, according to an embodiment.

FIG. 8 is a diagram illustrating a method of determining a preset reference, according to an embodiment. Referring to FIG. 8, a table 810 shows lane line painting standards or references according to road classes or road types.

In an embodiment, the preset threshold, that is, the top threshold ratio, may be determined based on various conditions such as a traffic situation, a country-specific road traffic law, and a road type.

For example, in the table 810, when the road type is national roads III and IV, a lane width is 13 m and a lane line painting portion corresponding to a double lane line region is 5 m. In this case, the preset reference (e.g., top threshold percentage) for the national roads III and IV may be determined from the ratio of the lane line painting portion to the lane width expressed as a percentage value, that is, (the lane line painting portion)/(the lane width)×100=5/13×100=39%.

The standards for the lane width and the lane line painting portion may vary according to the country-by-country road traffic laws in addition to the road types. Thus, the confidence of the lane line detected for each country may be improved by applying different preset references according to the country-specific road traffic laws.

Figure 9:
FIGS. 9 and 10 are diagrams illustrating a method of determining driving, information of a vehicle, according to embodiments.

FIG. 9 is a diagram illustrating a method of determining driving information of a vehicle, according to an embodiment. Referring to FIG. 9, a diagram 910 shows driving lane boundary lines selected based on the confidence value, and a diagram 930 shows a driving path calculated by the center line determined based on the driving lane boundary lines.

The process of FIG. 9 may be performed, for example, by the center line determination unit 340 described above.

When the confidence value is determined for each lane line by the above method, the determination apparatus may determine whether each lane line is reliable as an actual lane line. The determination apparatus may compare a confidence value of each lane line with a preset threshold value and determine a center line of the driving lane based on the comparison result. For example, when a confidence value of each lane is greater than or equal to a preset threshold value T, the determination apparatus may determine a center line 935 by determining the lane line corresponding to the confidence value as an actual lane line.

For example, when a reliable lane line is found on both sides of the lane on which the vehicle is driving as shown in the diagram 910, that is, when the confidence values of driving lane boundary lines are greater than a preset threshold value, the determination apparatus may determine the center between the driving lane boundary lines as the center line 935 of the driving lane as shown in the diagram 930.

Also, when a reliable lane line is found only on one side of the lane on which the vehicle is driving, that is, when the confidence value of one of the driving lane boundary lines is greater than a preset threshold value and the confidence value of the other one of the driving lane boundary lines is less than the preset threshold value, the determination apparatus may generate a virtual lane boundary line, for example, at a position of the vehicle width+(50×n) cm based on any one lane boundary line by considering the vehicle width. In this case, the value of n may be adjustable. For example, when the road width of a driving road is larger than that of a general road, it may be set as a value of n>1. For example, when the road width of a driving road is less than that of a general road, it may be set as a value of n<1. The determination apparatus may determine the center between a virtual lane boundary line and one lane boundary line as the center line 935 of the driving lane.

When the center line 935 is determined by the above method, the determination apparatus may calculate a driving path based on the center line 935 and determine the driving parameters of the vehicle such that the vehicle may drive along the driving path.

For example, when a reliable lane line is not obtained on both sides of the lane on which the vehicle is driving, the determination apparatus may not determine the center line of the driving lane.

Figure 10:
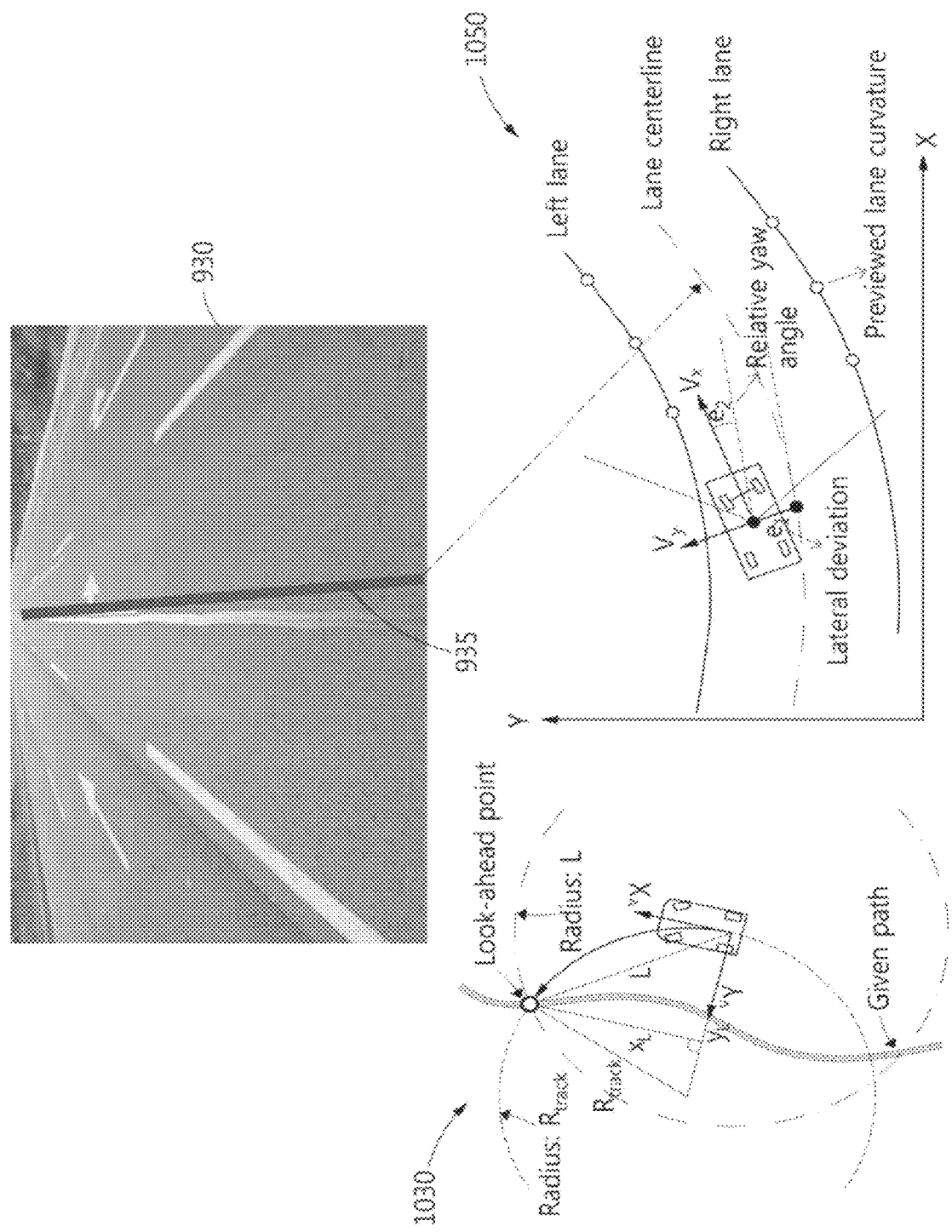

FIG. 10 is a diagram illustrating a method of determining driving information of a vehicle, according to an embodiment. Referring to FIG. 10, it illustrates a method of adjusting the lateral position of the vehicle based on the driving information of the vehicle according to an embodiment. The process of FIG. 10 may be performed by, for example, the driving information determination unit 230 or the localization unit 350 and the lateral control unit 360 described above.

When the center line 935 of the driving lane is determined as shown in the diagram 930, the determination apparatus may generate a driving parameter for adjusting the position of the vehicle such that the vehicle may drive along the center line 935 of the driving lane.

For example, the determination apparatus may select one or more representative points (e.g., look-ahead points) located at a prediction distance from the current position along the driving lane (or the center line of the driving lane) as shown in a diagram 1030 and determine curvature information by using the representative point(s) as shown in a diagram 1050. For example, the determination apparatus may calculate a regression function representing the shape of the road through linear regression analysis of representative points along the center line of the lane. The determination apparatus may recognize the shape of the road by using the regression function and determine the curvature information based on the shape of the road. For example, when the regression function is a polynomial such as $C_2 x^2 + C_1 x$ the determination apparatus may determine $C_2$ and $C_1$ respectively corresponding to the polynomial coefficients as the curvature information.

Also, for example, by estimating a lateral offset by calculating the distance between the center line 935 of the driving lane and the lateral position of the vehicle, the determination apparatus may generate a driving parameter such that the vehicle may not deviate greatly from the center line 935 of the driving lane, e.g., such that the vehicle is not over a boundary line of the driving lane. For example, the determination apparatus may control the steering of the vehicle by controlling the steering angle of the steering wheel of the vehicle based on the driving parameter.

Figure 11:
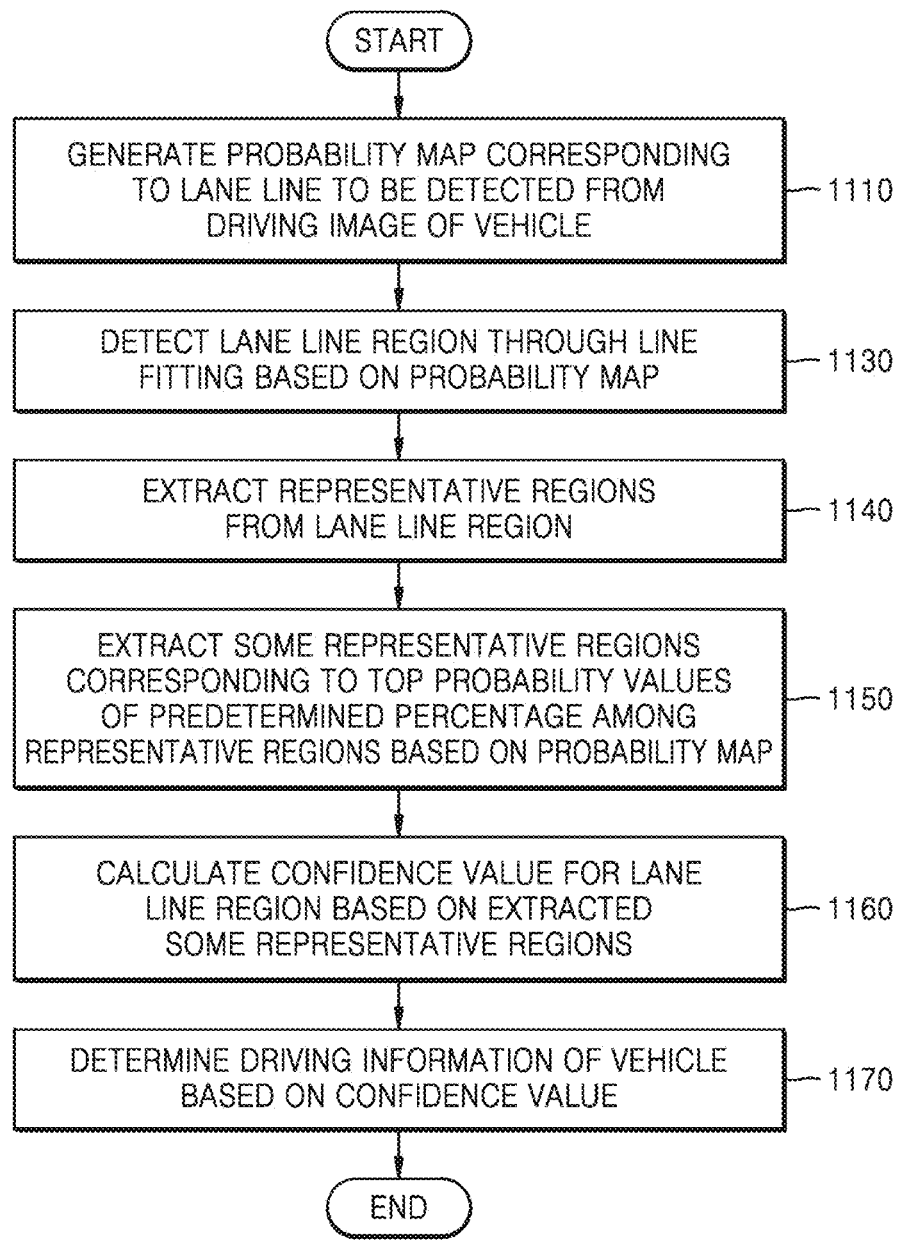
FIG. 11 is a flowchart illustrating a method of determining driving information, according to another embodiment.

FIG. 11 is a flowchart illustrating a method of determining driving information, according to another embodiment. Referring to FIG. 11, the determination apparatus according to an embodiment may generate a probability map corresponding to a lane line to be detected from a driving image based on pixel-by-pixel segmentation (operation 1110).

The determination apparatus may detect a lane line region through line fitting based on the probability map (operation 1130).

The determination apparatus may extract representative regions from the lane line region (operation 1140). The determination apparatus may extract some representative regions corresponding to top probability values of a predetermined percentage among the representative regions based on the probability map (operation 1150).

The determination apparatus may calculate a confidence value for the lane line region based on the extracted some representative regions (operation 1160).

The determination apparatus may determine driving information of the vehicle based on the confidence value (operation 1170).

Figure 12:
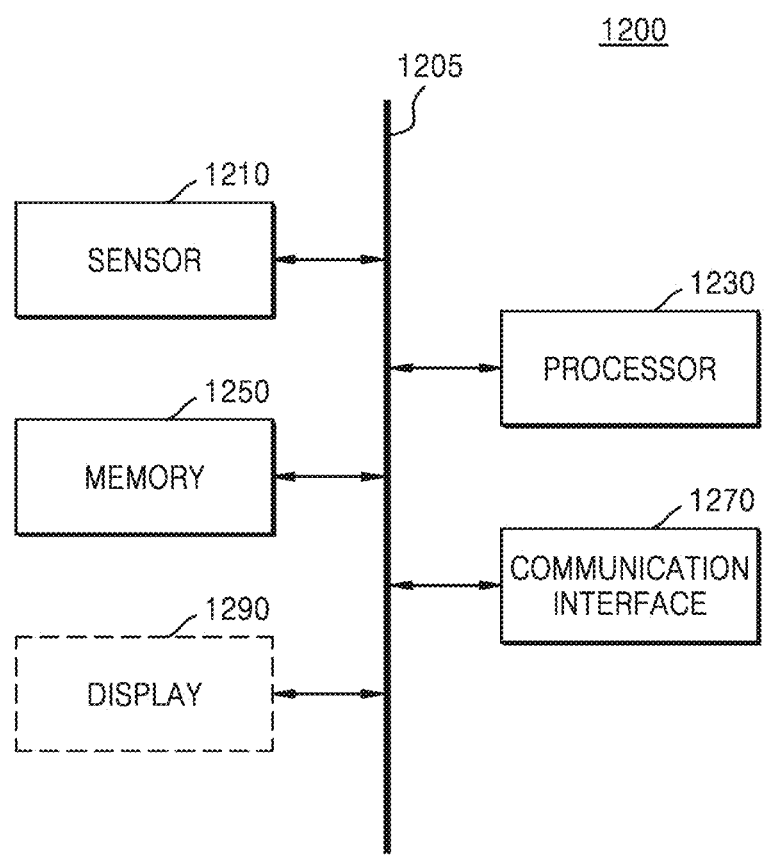
FIG. 12 is a block diagram of an apparatus for determining driving information according to an embodiment.

FIG. 12 is a block diagram of an apparatus for determining driving information according to an embodiment. Referring to FIG. 12, a determination apparatus 1200 according to an embodiment may include one or more sensors 1210, a processor 1230, and a communication interface 1270. The determination apparatus 1200 may further include a memory 1250 and a display 1290. The sensor(s) 1210, the processor 1230, the memory 1250, the communication interface 1270, and the display 1290 may communicate with each other through a communication bus 1205.

The sensor(s) 1210 may sense, e.g., capture or obtain, a driving image.

The sensor(s) 1210 may include, for example, a camera sensor, an image sensor, a vision sensor, an inertial measurement unit (IMU) sensor, a gyro sensor, an acceleration sensor, a global positioning system (GPS) sensor, a geomagnetic sensor, a LiDAR sensor, a radar sensor, and/or an altitude measurement sensor; however, the inventive concept is not limited thereto. The camera sensor, the image sensor, and/or the vision sensor may be mounted on the vehicle to capture a driving image of the vehicle. The IMU sensor, the gyro sensor, and/or the altitude measurement sensor may sense pitch information of the vehicle. The LiDAR sensor and/or the radar sensor may sense the local or world domain coordinates of an object. The GPS sensor may sense the global world domain coordinates of the vehicle.

The processor 1230 may generate a probability map corresponding to a target object to be detected from the driving image. The processor 1230 may extract representative regions from a candidate region of the target object detected from the driving image. The processor 1230 may extract some of the representative regions based on the probability map. The processor 1230 may calculate a confidence value for the candidate region of the target object based on the extracted some representative regions. The processor 1230 may determine the driving information of the vehicle based on the confidence value.

The processor 1230 may perform at least one method described above with respect to FIGS. 1 to 11 or an algorithm corresponding to the at least one method. The processor 1230 may execute the program and control the determination apparatus 1200. The program code executed by the processor 1230 may be stored in the memory 1250. The processor 1230 may include, for example, a central processing unit (CPU) or a graphics processing unit (GPU).

The memory 1250 may store the driving image and the confidence value. Also, the memory 1250 may store the driving information of the vehicle determined by the processor 1230. Also, the memory 1250 may store the representative regions extracted by the processor 1230.

The memory 1250 may include a volatile memory or a nonvolatile memory.

The communication interface 1270 may output the driving information. Also, the communication interface 1270 may receive a driving image captured outside the determination apparatus 1200, information of various sensors received from outside the determination apparatus 1200, map information, and/or the like. According to embodiments, the communication interface 1270 may transmit the driving information of the vehicle determined by the processor 1230 to the outside of the determination apparatus 1200 or to the display 1290.

The display 1290 may display the driving information of the vehicle. For example, when the determination apparatus 1200 is embedded in the vehicle, the display 1290 may include an HUD or an indicator light installed in the vehicle.

The embodiments described above may be implemented as hardware components, software components, and/or a combination of hardware components and software components. For example, the apparatuses, methods, and components described in the embodiments may be implemented by using one or more general-purpose computers or special-purpose computers such as processors, controllers, arithmetic logic units (ALUs), digital signal processors, microcomputers, field programmable gate arrays (FPGAs), programmable logic units (PLUs), microprocessors, or any other apparatuses capable of executing and responding to instructions. The processor may execute an operating system (OS) and one or more software applications that are executed on the OS. Also, the processor may access, store, operate, process, and generate data in response to execution of the software. For convenience of understanding, the processor may be described as being used singly; however, those of ordinary skill in the art will understand that the processor may include a plurality of processing elements and/or a plurality of types of processing elements. For example, the processor may include a plurality of processors or one processor and one controller. Also, other processing configurations such as parallel processors may also be possible.

The software may include computer programs, code, commands (instructions), or a combination of one or more thereof and may configure the processor to operate as desired or may command the processor independently or collectively. In order to be interpreted by the processor or to provide commands or data to the processor, software and/or data may be permanently or temporarily embodied in any type of machine, component, physical apparatus, virtual equipment, computer storage medium or apparatus, or transmitted signal wave. The software may be distributed over a network-coupled computer system to be stored or executed in a distributed manner. The software and data may be stored on one or more computer-readable recording mediums.

The method according to an embodiment may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the embodiment, or may be those that are known and available to computer programmers skilled in the art. Examples of the computer-readable recording mediums may include magnetic recording mediums such as hard disks, floppy disks, and magnetic tapes, optical recording mediums such as compact disk read-only memories (CD-ROMs) and digital versatile disks (DVDs), magneto-optical recording mediums such as floptical disks, and hardware devices such as ROMs, RAMs, and flash memories that are especially configured to store and execute program commands. Examples of the program commands may include machine language code that may be generated by a compiler, and high-level language code that may be executed by a computer by using an interpreter. The hardware device may be configured to operate as one or more software modules in order to perform the operation of the embodiment, and vice versa.

While the embodiments have been described above with reference to the drawings, those of ordinary skill in the art may make various changes and modifications therein without departing from the spirit and scope of the inventive concept. For example, the described techniques may be performed in a different order than the described method, and/or the described components such as systems, structures, devices, and circuits may be united or combined in a different form than the described method or may be replaced or substituted by other components or equivalents thereof. Therefore, other implementations, other embodiments, and equivalents of the following claims are also within the scope of the following claims.

While the inventive concept has been particularly shown and described with reference to embodiments thereof, it will be understood that various changes in form and details may be made therein without departing from the spirit and scope of the following claims.

What is claimed is:

1. A method of determining driving information of a vehicle, the method comprising:
   generating a probability map corresponding to a target object to be detected from a driving image, the probability map being generated based on determining a probability value for a unit of at least one pixel;
   extracting representative regions from a candidate region of the target object detected from the driving image;
   extracting at least two of the extracted representative regions, based on the generated probability map, the at least two of the extracted representative regions having highest probability values among all probability values of the extracted representative regions;

calculating a confidence value for the candidate region of the target object, to be an average value of the highest probability values of the extracted at least two of the representative regions; and determining the driving information of the vehicle, based on the calculated confidence value, wherein the target object comprises lane lines including boundary lines of a driving lane of the vehicle, and wherein the determining of the driving information of the vehicle comprises:

comparing each of confidence values of the boundary lines of the driving lane with a preset threshold value; and based on each of the confidence values of the boundary lines of the driving lane being compared to be greater than the preset threshold value, determining a center between the boundary lines of the driving lane as a center line of the driving lane.

2. The method of claim 1, wherein the highest probability values are a top threshold percentage among the all probability values, the top threshold percentage being determined based on any one or any combination of a traffic situation, a country-specific road traffic law, and a road type.

3. The method of claim 1, wherein the extracting of the representative regions comprises extracting the representative regions from the candidate region of the target object, at equal intervals.

4. The method of claim 1, wherein the extracting of the representative regions comprises extracting the representative regions from the candidate region of the target object, based on either one or both of a preset distance range corresponding to a region of interest (ROI) and a number of preset representative regions.

5. The method of claim 1, wherein the extracting of the representative regions comprises:

converting the candidate region of the target object from an image domain to a world domain; and extracting the representative regions from the candidate region converted to the world domain, at equal intervals.

6. The method of claim 1, wherein the generating of the probability map comprises generating the probability map corresponding to the target object by calculating a plurality of probability values in units of one pixel, based on the driving image, each of the plurality of probability values comprising a probability value that a corresponding pixel will correspond to the target object.

7. The method of claim 1, wherein the generating of the probability map comprises:

determining pixel-by-pixel classes of the driving image, using a scene segmentation algorithm; and generating a class-by-class probability map by calculating a pixel-by-pixel probability value of each of the pixel-by-pixel classes.

8. The method of claim 1, wherein the determining of the driving information of the vehicle comprises, based on one of the confidence values of one of the boundary lines of the driving lane being compared to be greater than the preset threshold value and another one of the confidence values of another one of the boundary lines of the driving lane being compared to be less than the preset threshold value:

generating a virtual lane boundary line, based on the one of the boundary lines of the driving lane and a width of the vehicle; and determining a center between the generated virtual lane boundary line and the one of the boundary lines of the driving lane as the center line of the driving lane.

9. The method of claim 1, further comprising adjusting a lateral position of the vehicle, based on information of the determined center line of the driving lane.

10. A method of determining driving information of a vehicle, the method comprising:

generating a probability map corresponding to a lane line to be detected from a driving image, based on pixel-by-pixel segmentation, the probability map being generated based on determining a probability value for a unit of at least one pixel;

detecting a lane line region, based on line fitting on the generated probability map;

extracting representative regions from the detected lane line region;

extracting at least two of the extracted representative regions, based on the generated probability map, the at least two of the extracted representative regions corresponding to highest probability values of a predetermined percentage among all probability values of the extracted representative regions;

calculating a confidence value for the lane line region, to be an average value of the highest probability values of the extracted at least two of the representative regions; and determining the driving information of the vehicle, based on the calculated confidence value, wherein the target object comprises lane lines including boundary lines of a driving lane of the vehicle, and wherein the determining of the driving information of the vehicle comprises:

comparing each of confidence values of the boundary lines of the driving lane with a preset threshold value; and based on each of the confidence values of the boundary lines of the driving lane being compared to be greater than the preset threshold value, determining a center between the boundary lines of the driving lane as a center line of the driving lane.

11. An apparatus for determining driving information of a vehicle, the apparatus comprising:

a sensor configured to obtain a driving image;

a processor configured to:

generate a probability map corresponding to a target object to be detected from the driving image, the probability map being generated based on determining a probability value for a unit of at least one pixel;

extract representative regions from a candidate region of the target object detected from the driving image;

extract at least two of the extracted representative regions, based on the generated probability map, the at least two of the extracted representative regions having highest probability values among all probability values of the extracted representative regions;

calculating a confidence value for the candidate region of the target object, to be an average value of the highest probability values of the extracted at least two the representative regions; and determine the driving information of the vehicle, based on the calculated confidence value; and a communication interface configured to output the determined driving information, wherein the target object comprises lane lines including boundary lines of a driving lane of the vehicle, and wherein the processor is further configured to:

compare each of confidence values of the boundary lines of the driving lane with a preset threshold value; and based on each of the confidence values of the boundary lines of the driving lane being compared to be greater than the preset threshold value, determine a center between the boundary lines of the driving lane as a center line of the driving lane.

12. The apparatus of claim 11, wherein the highest probability values are a top threshold percentage among the all probability values, the top threshold percentage being determined based on any one or any combination of a traffic situation, country-specific road traffic law, and a road type.

13. The apparatus of claim 11, wherein the processor is further configured to extract the representative regions from the candidate region of the target object, at equal intervals.

14. The apparatus of claim 11, wherein the processor is further configured to extract the representative regions from the candidate region of the target object, based on either one or both of a preset distance range corresponding to a region of interest (ROI) and a number of preset representative regions.

* * * * *